US006927516B2

(12) United States Patent
Furuse

(10) Patent No.: US 6,927,516 B2
(45) Date of Patent: Aug. 9, 2005

(54) BEARING LUBRICATING STRUCTURE OF TWO ROTOR SINGLE STATOR TYPE ELECTRIC MOTOR

(75) Inventor: Hisayuki Furuse, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/859,170

(22) Filed: Jun. 3, 2004

(65) Prior Publication Data

US 2004/0245875 A1 Dec. 9, 2004

(30) Foreign Application Priority Data

Jun. 5, 2003 (JP) ....................................... 2003-160718

(51) Int. Cl.[7] .............................................. H02K 5/16
(52) U.S. Cl. ...................................................... 310/90
(58) Field of Search .......................... 310/89–91, 254, 310/261

(56) References Cited

U.S. PATENT DOCUMENTS

| 4,322,030 A | * | 3/1982 | Jacobson et al. | ............. | 494/15 |
| 5,541,462 A | * | 7/1996 | Nii et al. | ...................... | 310/90 |
| 6,114,784 A | | 9/2000 | Nakano | | |
| 6,741,001 B2 | * | 5/2004 | Takayanagi | .................. | 310/90 |
| 6,756,714 B2 | * | 6/2004 | Alex et al. | ..................... | 310/90 |

FOREIGN PATENT DOCUMENTS

JP         2000-14086 A        1/2000

OTHER PUBLICATIONS

U.S. Appl. No. 10/815,865, filed Apr. 2, 2004, Oshidari et al.
U.S. Appl. No. 10/830,105, filed Apr. 23, 2004, Arimitsu et al.

* cited by examiner

Primary Examiner—Thanh Lam
(74) Attorney, Agent, or Firm—Foley & Lardner LLP

(57) ABSTRACT

In a two rotor signal stator type electric motor, there is defined a bearing lubricating structure. The bearing lubricating structure comprises an oil flow passage that is defined at a rear end portion of the motor and is supplied with a lubrication oil under operation of the motor. Within the oil flow passage, there are arranged a first bearing that is operatively arranged between a rotation shaft of an outer rotor and a rotation shaft of an inner rotor and a second bearing that is operatively arranged between a rotor rear disc of the outer rotor and a fixed stator rear disc of a stator. A first oil distribution passage is exposed to a radially inner part of the oil flow passage to permit a lubrication oil flow from the oil flow passage toward the stator and inner rotor, and a second oil distribution passage is exposed to a radially outer part of the oil flow passage to permit a lubrication oil flow from the oil flow passage toward the stator and outer rotor.

9 Claims, 2 Drawing Sheets

US 6,927,516 B2

BEARING LUBRICATING STRUCTURE OF TWO ROTOR SINGLE STATOR TYPE ELECTRIC MOTOR

BACKGROUND OF THE INVENTION

1. Field of the Invention

The present invention relates in general to electric motors and more particularly to the electric motors of a two rotor single stator type which comprises outer and inner rotors which rotate around and within a single common stator. More specifically, the present invention is concerned with a bearing lubricating structure practically employed in such electric motors.

2. Description of the Related Art

One bearing lubricating structure of the above-mentioned type electric motors is shown in Japanese Laid-open Patent Application (Tokkai) 2000-014086. In the bearing lubricating structure of this published application, a bearing operatively disposed between a stator rear disc that supports the stator and a rotor rear disc that supports the outer rotor and another bearing that operatively supports a rear part of an output shaft of the inner rotor are of an oil seal type pregnant with grease.

SUMMARY OF THE INVENTION

However, it has been revealed that the bearing lubricating structure of the published application fails to exhibit a satisfied bearing and lubricating performance due to its inherent construction.

It is therefore an object of the present invention to provide a bearing lubricating structure of a two rotor single stator type electric motor, which can exhibit a satisfied bearing lubricating performance.

According to the present invention, there is provided a bearing lubricating structure of a two rotor single stator type electric motor, which sufficiently lubricates two essential bearings of the motor and sufficiently cools the stator, inner rotor and outer rotor of the motor.

According to the present invention, there is provided a bearing lubricating structure of a two rotor single stator type electric motor. The motor includes a fixed annular stator, a fixed rear disc that extends radially inward from a rear end portion of the stator, an annular inner rotor rotatably arranged in the stator, an annular outer rotor rotatably arranged around the stator, a hollow first rotation shaft concentrically and tightly received in the inner rotor to rotate together like a unit about a common axis, a second rotation shaft concentrically and rotatably received in the first rotation shaft, a rotor rear disc that extends radially to connect a rear end portion of the outer rotor to a rear end portion of the second rotation shaft so that the outer rotor, the rotor rear disc and the second rotation shaft rotate together like a unit about the common axis, a first bearing operatively arranged between a first portion of the rotor rear disc and the first rotation shaft and a second bearing operatively arranged between a second portion of the rotor rear disc and the stator rear disc. The bearing lubricating structure comprises a first oil passage formed in the second rotation shaft, into which a lubrication oil is led; an annular oil space defined between the second rotation shaft and the first rotation shaft, the annular oil space being communicated with the first oil passage of the second rotation shaft; a second oil passage substantially defined by a rear end portion of the first rotation shaft, the stator rear disc and the rotor rear disc, the second oil passage having the first and second bearings received therein; a drain port provided by the rotor rear disc to connect the second oil passage with an outside of the rotor rear disc; a first oil distribution passage provided for permitting an oil flow from the second oil passage toward a space in which the stator and the inner rotor are arranged; and a second oil distribution passage provided for permitting an oil flow from the second oil passage toward a space in which the stator and the outer rotor are arranged.

DETAILED DESCRIPTION OF THE INVENTION

In the following, the present invention will be described in detail with reference to the accompanying drawings.

For ease of understanding, various directional terms, such as right, left, upper, lower, rightward and the like, are used in the following description. However, such terms are to be understood with respect to only a drawing or drawings on which a corresponding part or portion is shown.

Figure 1:
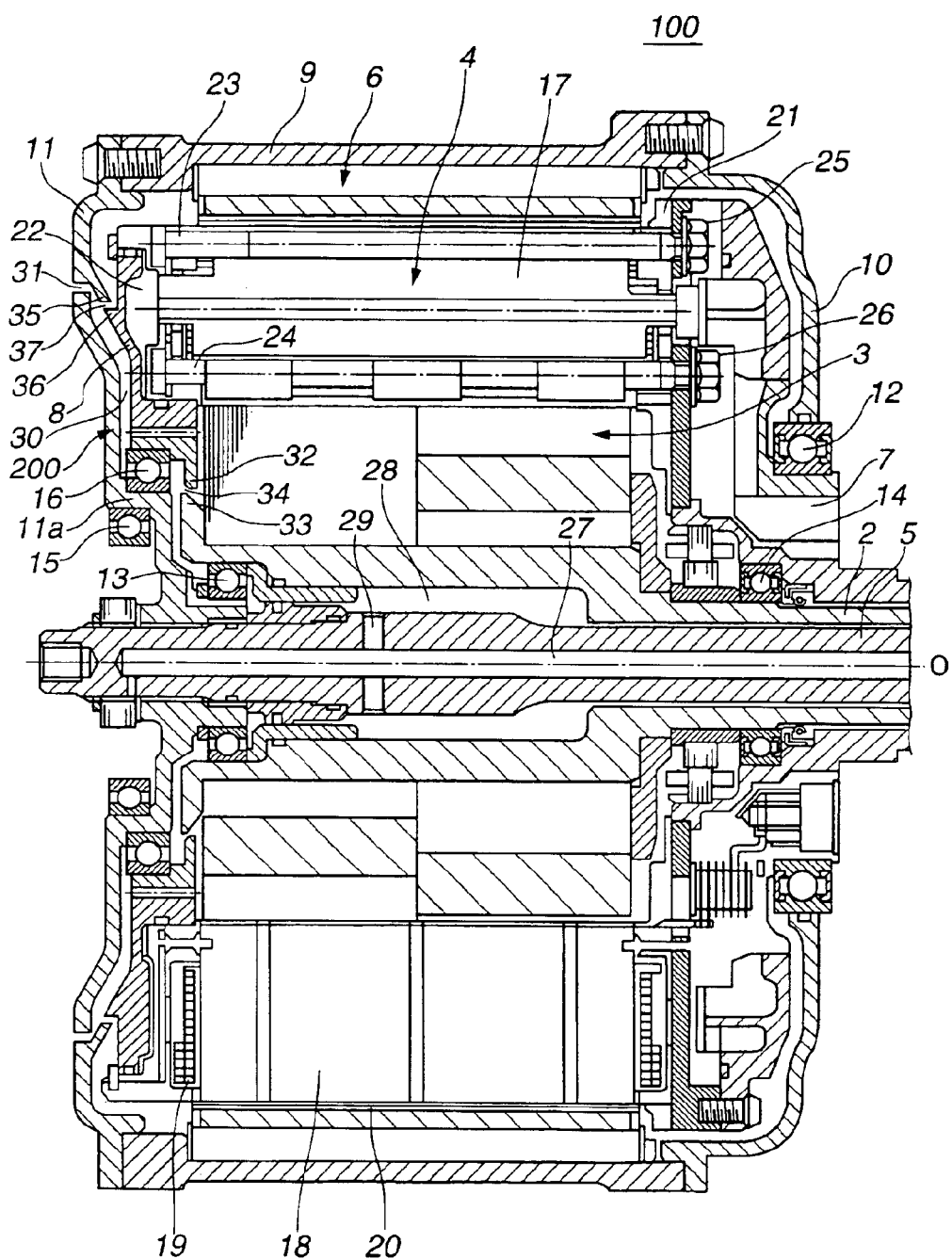
FIG. 1 is a sectional view of a two rotor single stator type electric motor that has a bearing lubricating structure according to the present invention.

Referring to FIG. 1, there is shown a two rotor single stator type electric motor 100 that has an improved bearing lubricating structure 200 of the present invention incorporated therewith.

It is to be noted that in FIG. 1, left and right sides of this drawing show rear and front sides of electric motor 100 respectively.

Electric motor 100 comprises generally an annular inner rotor 3 that is concentrically and tightly mounted on a hollow first rotation shaft 2 to rotate therewith, a fixed annular stator 4 that is concentrically arranged around inner rotor 3, and an annular outer rotor 6 that is concentrically and rotatably arranged around annular stator 4 and connected through a rotor rear disc 11 to a second rotation shaft 5 that is concentrically received in hollow first rotation shaft 2.

That is, these inner and outer rotors 3 and 6 independently rotate within and around stator 4 together with their associated first and second rotation shafts 2 and 5, respectively.

As shown, a front end (or right end in the drawing) of annular stator 4 is connected to an annular flange portion of a fixed stator shaft 7, and a rear end of annular stator 4 is connected to a fixed stator rear disc 8.

Outer rotor 6 is tightly installed in a rotor case 9 that has a front end connected through bolts to a rotor front disc 10 and a rear end connected through bolts to the above-mentioned rotor rear disc 11.

As shown, rotor front disc 10 of outer rotor 6 has a radially inner end that is rotatably disposed through a bearing 12 on an annular step portion of stator shaft 7, and rotor rear disc 11 of outer rotor 6 has a radially inner end that is splined to a rear end portion of second rotation shaft 5.

Thus, outer rotor 6, rotor case 9, rotor front disc 10, rotor rear disc 11 and second rotation shaft 5 constitute a unit that rotates about a common axis "O", that is, the axis of second rotation shaft 5.

A rear portion of first rotation shaft 2 is rotatably supported through a radial bearing (or first bearing) 13 on a cylindrical step defined by the radially inner end portion of rotor rear disc 11 that is splined to second rotation shaft 5, and a front portion of first rotation shaft 2 is rotatably supported through a bearing 14 on a cylindrical recess defined by the radially inner end portion of the fixed stator shaft 7. Functionally, radial bearing 13 is arranged between the rear portion of first rotation shaft 2 and the rear portion of second rotation shaft 5, and bearing 14 is arranged between the radially inner end portion of the fixed stator shaft 7 and the front portion of first rotation shaft 2. Each bearing 13 or 14 comprises inner and outer races and a plurality of bearing balls that are operatively disposed between the inner and outer races.

As shown, the radially inner end portion of rotor rear disc 11 of outer rotor 6 is formed with a cylindrical step portion 11a that is rotatably supported and sandwiched by inner and outer radial bearings 15 and 16. Although not shown in the drawing, inner bearing 15 is disposed at its inner race on a cylindrical step formed on a motor rear case, while outer bearing (or second bearing) 16 is received at its outer race in a cylindrical recess defined by the radially inner end portion of the fixed stator rear disc 8.

Annular stator 4 comprises a stator core 18 that includes a plurality of stator teeth 20 that are circumferentially arranged around common axis "O". Between every adjacent two of stator teeth 20, there is arranged a supporting strut 17 that extends along common axis "O". Each stator tooth 20 includes a plurality of flat magnetic steel plates that are aligned along common axis "O" while intimately and closely contacting to one another. Each stator tooth 20 has a coil 19 that is put therearound making round-trips in a direction parallel with the common axis "O".

A plurality of first retaining plates 21 are put on the front end of stator core 18, each first retaining plate 21 spanning adjacent two of the teeth 20, and a plurality of second retaining plates 22 are put on the left end of stator core 18, each second retaining plate 22 spanning adjacent two of the teeth 20. First and second retaining plates 21 and 22 are constructed of a high-strength metal and have each a sector form. These first and second retaining plates 21 and 22 are connected through bolts 23 and 24 and nuts 25 and 26. By fastening nuts 25 and 26, stator core 18, that is, a unit including stator teeth 20 and supporting struts 17 is tightly sandwiched between a front collar assemblage including first retaining plates 21 and a rear collar assemblage including second retaining plates 22.

Each of inner rotor 3 and outer rotor 6 comprises a plurality of permanent magnets. However, the numbers of magnets held by these inner and outer rotors 3 and 6 are different to cause the rotors 3 and 6 to be different in polar pairs.

Coils 19 held by the respective stator teeth 20 are parted into three, that is, first, second and third groups, the first being a group including a coil through which a U-phase current flows, the second being a group including a coil through which a V-phase current flows and the third being a group including a coil through which a W-phase current flows. Under operation of the motor 100, a compound electric current that includes the U-, V- and W-phase currents is fed to coils 19. Thus, inner and outer rotors 3 and 6 are forced to rotate independently at different rotation speeds.

In the following, the bearing lubricating structure 200 of the present invention will be described in detail with reference to FIG. 1.

Bearing lubricating structure 200 comprises an oil passage 27 that extends axially in second rotation shaft 5. Between second rotation shaft 5 and first rotation shaft 2, there is defined an annular oil space 28 that is connected to oil passage 27 through a radial oil passage 29 that is formed in second rotation shaft 5.

Furthermore, an oil passage 30 is defined by a rear end portion of first rotation shaft 2, stator rear disc 8 and rotor rear disc 11, which is connected at its radially inner portion to annular oil space 28 through outer radial bearing 16 and radial bearing 13. Oil passage 30 has a drain port 31 that is formed in a radially outer portion of rotor rear disc 11 of outer rotor 6.

As shown in the drawing, stator rear disc 8 is formed at its radially inner end with an annular flange (or first oil guiding element) 32 that extends radially inward, and first rotation shaft 2 is formed at its rear end with an annular flange (or second oil guiding element) 33 that extends radially outward, that is, toward annular flange 32 of stator rear disc 8. Between mutually facing edges of the two annular flanges 32 and 33, there is defined an annular slit (or first oil distribution passage) 34 that is exposed to oil passage 30 at a position between the two radial bearings 13 and 16. Due to provision of annular slit 34, lubrication oil in oil passage 30 is permitted to flow into a space in which stator 4 and inner rotor 3 are arranged.

Furthermore, as shown in the drawing, rotor rear disc 11 of outer rotor 6 is formed, at a portion near drain port 31, with a conical projection (or third oil guiding element) 35 that extends radially inward, and stator rear disc 8 is formed, at a portion near drain port 31, with an annular projection (or fourth oil guiding element) 36 that projects radially rearward, that is, toward conical projection 35. Between mutually facing edges of the two projections 35 and 36, there is defined an annular slit (or second oil distribution passage) 37 that is exposed to oil passage 30 at a position between drain port 31 and outer radial bearing 16. Due to provision of annular slit 34, lubrication oil in oil passage 30 is permitted to flow into a space in which stator 4 and outer rotor 6 are arranged.

Under operation of the electric motor 100, the lubrication oil is led into oil passage 27 of second rotation shaft 5 from an oil pump (not shown), and the oil is forced to flow to oil passage 30 through radial oil passage 29, annular oil space 28 and radial bearings 13 and 16, and the lubrication oil in oil passage 30 is drained from drain port 31. Thus, the two radial bearings (that is, first and second bearings) 13 and 16 can be sufficiently lubricated by the lubrication oil.

During the flow of the lubrication oil toward drain port 31, part of the lubrication oil is led through first oil distribution passage 34 into the space for both stator 4 and inner rotor 3 thereby to effectively and sufficiently cool these devices 4 and 3, and led through second oil distribution passage 37 into the space for both stator 4 and outer rotor 6 thereby to effectively and sufficiently cool these devices 4 and 6.

By determining the size and/or shape of each of first and second oil distribution passages 34 and 37 to a suitable one, the amount of the lubrication oil fed to stator 4, inner rotor 3 and outer rotor 6 can be controlled so as to minimize a viscous resistance applied to such devices 4, 3 and 6 while exhibiting the maximum cooling effect to the devices 4, 3 and 6.

Figure 2A:
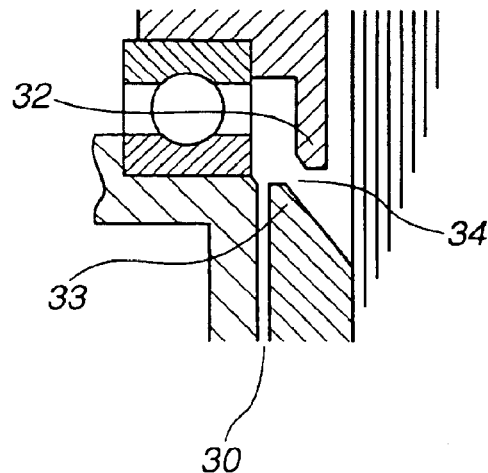
FIGS. 2A and 2B are enlarged sectional views respectively showing two shapes of a first oil distribution passage employed in the bearing lubricating structure of the present invention.
Figure 2B:
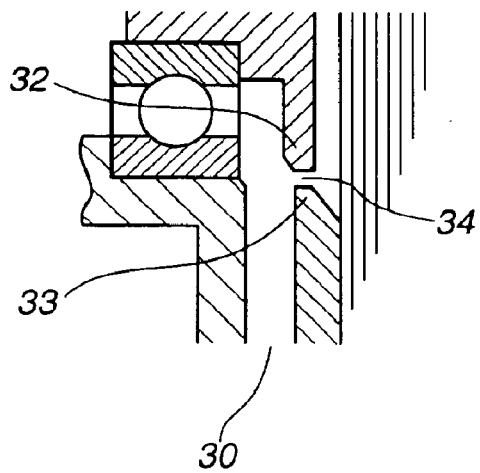
Figure 3A:
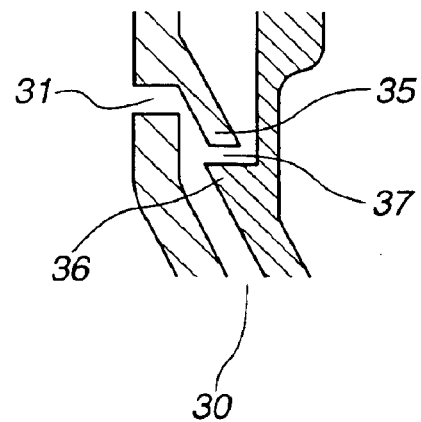
FIGS. 3A and 3B are enlarged sectional views respectively showing two shapes of a second oil distribution passage employed in the bearing lubricating structure of the present invention.
Figure 3B:
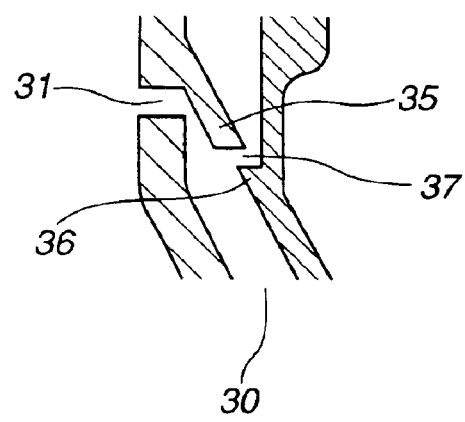

Measures for controlling the amount of the lubrication oil fed to stator 4 and inner rotor 3 are shown in FIGS. 2A and 2B, and the measures for controlling the amount of the lubrication oil fed to stator 4 and outer rotor 6 are shown in FIGS. 3A and 3B.

As is seen from FIG. 2A, when the edge of second oil guiding element 33 is shifted rearward relative to that of first oil guiding element 32, first oil distribution passage 34 permits only a smaller oil flow toward stator 4 and inner rotor 3. While, when, as is seen from FIG. 2B, the edge of second oil guiding element 33 is shifted forward relative to that of first oil guiding element 32, first oil distribution passage 34 permits a larger oil flow toward stator 4 and inner rotor 3.

As is seen from FIG. 3A, when the edge of fourth oil guiding element 36 is shifted rearward relative to that of third oil guiding element 35, second oil distribution passage 37 permits only a smaller oil flow toward stator 4 and outer rotor 6. While, when, as is seen from FIG. 3B, the edge of fourth oil guiding element 36 is shifted forward relative to that of third oil guiding element 35, second oil distribution passage 37 permits a larger oil flow toward stator 4 and outer rotor 6.

Of course, by varying a distance in a radial direction between the edges of first and second oil guiding elements 32 and 33, the amount of the oil flowing through first oil distribution passage 34 can be adjusted. Like this, by varying a distance in a radial direction between the edges of third and fourth oil guiding elements 35 and 36, the amount of the oil flowing through second oil distribution passage 37 can be adjusted.

In the following, advantages of the present invention will be described.

Because the two bearings (viz., first and second bearings) 13 and 16 are arranged in the oil passage 30 to which lubrication oil is fed, lubrication of these bearings 13 and 16 is sufficiently carried out.

Due to provision of first oil distribution passage 34, stator 4 and inner rotor 3 can be sufficiently cooled. Due to provision of second oil distribution passage 37, stator 4 and outer rotor 6 are sufficiently cooled.

By determining the size and/or shape of each of first and second oil distribution passages 34 and 37 to a suitable one, the amount of the lubrication oil fed to stator 4, inner rotor 3 and outer rotor 6 can be controlled in a manner to minimize the viscous resistance applied to these devices 4, 3 and 6 while exhibiting a satisfied cooling effect to them.

The entire contents of Japanese Patent Application 2003-160718 (filed Jun. 5, 2003) are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A bearing lubricating structure of a two rotor single stator type electric motor, the motor including a fixed annular stator, a fixed rear disc that extends radially inward from a rear end portion of the stator, an annular inner rotor rotatably arranged in the stator, an annular outer rotor rotatably arranged around the stator, a hollow first rotation shaft concentrically and tightly received in the inner rotor to rotate together like a unit about a common axis, a second rotation shaft concentrically and rotatably received in the first rotation shaft, a rotor rear disc that extends radially to connect a rear end portion of the outer rotor to a rear end portion of the second rotation shaft so that the outer rotor, the rotor rear disc and the second rotation shaft rotate together like a unit about the common axis, a first bearing operatively arranged between a first portion of the rotor rear disc and the first rotation shaft and a second bearing operatively arranged between a second portion of the rotor rear disc and the stator rear disc, the bearing lubricating structure comprising:
a first oil passage formed in the second rotation shaft, into which a lubrication oil is led;
an annular oil space defined between the second rotation shaft and the first rotation shaft, the annular oil space being communicated with the first oil passage of the second rotation shaft;
a second oil passage substantially defined by a rear end portion of the first rotation shaft, the stator rear disc and the rotor rear disc, the second oil passage having the first and second bearings received therein;
a drain port provided by the rotor rear disc to connect the second oil passage with an outside of the rotor rear disc;
a first oil distribution passage provided for permitting an oil flow from the second oil passage toward a space in which the stator and the inner rotor are arranged; and
a second oil distribution passage provided for permitting an oil flow from the second oil passage toward a space in which the stator and the outer rotor are arranged.

2. A bearing lubricating structure as claimed in claim 1, in which the first oil distribution passage is an annular slit that is defined between the rear end portion of the first rotation shaft and a radially inner end of the stator rear disc.

3. A bearing lubricating structure as claimed in claim 1, in which the second oil distribution passage is an annular slit that is defined between a projection formed on the rotor rear disc and a projection formed on the stator rear disc.

4. A bearing lubricating structure as claimed in claim 1, in which the first oil distribution passage is defined between a radially inward edge of an annular flange provided by the radially inner end of the stator rear disc and a radially outer edge of an annular flange provided by the rear end portion of the first rotation shaft.

5. A bearing lubricating structure as claimed in claim 1, in which the second oil distribution passage is defined between a radially inward edge of a conical projection provided by the rotor rear disc and a radially outward edge of an annular projection provided by the stator rear disc.

6. A bearing lubricating structure as claimed in claim 4, in which the radially outer edge of the annular flange provided by the rear end portion of the first rotation shaft is shifted by a given distance in a direction parallel with the common axis relative to the radially inward edge of the annular flange provided by the radially inner end of the stator rear disc.

7. A bearing lubricating structure as claimed in claim 4, in which the radially outward edge of the annular projection provided by the stator rear disc is shifted by a given distance in a direction parallel with the common axis relative to the radially inward edge of the conical projection provided by the rotor rear disc.

8. A bearing lubricating structure as claimed in claim 1, in which the first oil distribution passage is exposed to the second oil passage at a position between the first and second bearings.

9. A bearing lubricating structure as claimed in claim 1, in which the second oil distribution passage is exposed to the second oil passage at a position between the second bearing and the drain port.

* * * * *